United States Patent
Callard et al.

(10) Patent No.: US 8,811,306 B2
(45) Date of Patent: Aug. 19, 2014

(54) SYSTEM AND METHOD FOR SCHEDULING IN A MULTI-HOP ENVIRONMENT

(75) Inventors: Aaron Callard, Ottawa (CA); Gamini Senarath, Nepean (CA); Israfil Bahceci, Nepean (CA)

(73) Assignee: Futurewei Technologies, Inc., Plano, TX (US)

( * ) Notice: Subject to any disclaimer, the term of this patent is extended or adjusted under 35 U.S.C. 154(b) by 339 days.

(21) Appl. No.: 12/820,979

(22) Filed: Jun. 22, 2010

(65) Prior Publication Data

US 2011/0310814 A1 Dec. 22, 2011

(51) Int. Cl.
*H04W 4/00* (2009.01)

(52) U.S. Cl.
USPC ........................................... 370/329

(58) Field of Classification Search
CPC ........ H04B 7/2606; H04J 1/10; H04J 3/1682; H04J 4/00; H04L 5/0007; H04W 28/26; H04W 72/04; H04W 84/047; H04W 88/04
See application file for complete search history.

(56) References Cited

U.S. PATENT DOCUMENTS

| | | | | |
|---|---|---|---|---|
| 5,668,803 A | * | 9/1997 | Tymes et al. | 370/312 |
| 2010/0214972 A1 | * | 8/2010 | Che et al. | 370/315 |
| 2011/0199985 A1 | * | 8/2011 | Cai et al. | 370/329 |
| 2011/0222428 A1 | * | 9/2011 | Charbit et al. | 370/252 |
| 2012/0163287 A1 | * | 6/2012 | Raaf et al. | 370/315 |
| 2012/0250605 A1 | * | 10/2012 | Du et al. | 370/315 |

FOREIGN PATENT DOCUMENTS

| | | |
|---|---|---|
| CN | 101064901 A | 10/2007 |
| CN | 101505482 A | 8/2009 |
| CN | 101572654 A | 11/2009 |

OTHER PUBLICATIONS

Jain, A., et al., "Comparative Study of Scheduling Algorithms for WiMAX," Mobile and Pervasive Computing, CoMOC 2008, 4 pages, IEEE.

Sihombing, A., "Performance of Repeaters in 3GPP LTE," Master of Science Thesis, KTH Information and Communication Technology, Jun. 2009, 34 pages, Stockholm, Sweden.

Song, G., et al., "Joint Channel- and Queue-Aware Scheduling for Multiuser Diversity in Wireless OFDMA Networks," IEEE Transactions on Communications, vol. 57, No. 7, Jul. 2009, pp. 2109-2121.

International Search Report received in Patent Cooperation Treaty Application No. PCT/CN2011/075154, mailed Sep. 15, 2011, 3 pages.

* cited by examiner

*Primary Examiner* — Yong Zhou
(74) *Attorney, Agent, or Firm* — Slater & Matsil, L.L.P.

(57) ABSTRACT

In accordance with an embodiment, a method of operating a base station configured to communicate with a relay station includes allocating resources to the relay station. Allocating resources includes receiving feedback data from the relay station and scheduling resources to the relay station based on feedback data. Feedback data includes a total buffer size of the relay station and a number of user devices.

23 Claims, 6 Drawing Sheets

SYSTEM AND METHOD FOR SCHEDULING IN A MULTI-HOP ENVIRONMENT

TECHNICAL FIELD

The present invention relates generally to wireless communication systems, and more particularly to a system and method for scheduling in a multi-hop environment.

BACKGROUND

Wireless communication systems are widely used to provide voice and data services for multiple users using a variety of access terminals such as cellular telephones, laptop computers and various multimedia devices. Such communications systems can encompass local area networks, such as IEEE 801.11 networks, cellular telephone and/or mobile broadband networks. The communication system can use a one or more multiple access techniques, such as Frequency Division Multiple Access (FDMA), Time Division Multiple Access (TDMA), Code Division Multiple Access (CDMA), Orthogonal Frequency Division Multiple Access (OFDMA), Single Carrier Frequency Division Multiple Access (SC-FDMA) and others. Mobile broadband networks can conform to a number of system types or partnerships such as, General Packet Radio Service (GPRS), 3rd-Generation standards (3G), Worldwide Interoperability for Microwave Access (WiMAX), Universal Mobile Telecommunications System (UMTS), the 3rd Generation Partnership Project (3GPP), Evolution-Data Optimized EV-DO, or Long Term Evolution (LTE).

Some systems, such as LTE, strive to serve densely populated areas with very high data rates. One way in which an LTE network can provide dense coverage and high data capacity in a cost effective manner is to utilize Relay nodes (RNs), which function as base stations to used devices, but do not have a backhaul connections as base stations do. Instead, the RN communicates with an LTE base station (eNB) via a standard LTE radio link.

One of the functions of the eNB and RN is allocating bandwidth resources to user devices. LTE uses OFDMA for physical layer signaling in the downlink and SC-FDMA in the uplink. Bandwidth in these signaling schemes is shared among multiple users by allocating resource blocks having a portion of spectrum for a certain number of symbol periods. In LTE, the eNB allocates resource blocks to the RN, which, in turn, allocates resource blocks to user devices in communication with the RN. The eNB, however, does not have full knowledge of the status of individual user devices in communication with the RN. Rather the eNB relies on feedback from the RN in order to determine how many uplink and downlink resources to allocate to the RN.

In some relay systems, the relay communicates with a base station using flow control techniques. Such flow control techniques include, for example, signaling the base station to stop sending data whenever the relay node has too much data. Other techniques include, for example, the relay providing the base station with a per-user breakdown of data resources being used. As more information is sent back to the base station from the relay, however, system latency increases and a higher amount of bandwidth resources becomes devoted to status signaling.

SUMMARY OF THE INVENTION

In accordance with an embodiment, a method of operating a base station configured to communicate with a relay station includes allocating resources to the relay station. Allocating resources includes receiving feedback data from the relay station and scheduling resources to the relay station based on feedback data. Feedback data includes a total buffer size of the relay station and a number of user devices.

In accordance with another embodiment, a method of operating a base station configured to communicate with a relay station includes allocating resources to the relay station. Allocating includes receiving feedback data from the relay station, the feedback data comprising a percentage of a maximum amount of data, and scheduling resources to the relay station based on the feedback data.

In a further embodiment, a method of operating a relay node configured to communicate with a base station and user devices includes determining an amount of buffer space used, determining a number of user devices with data, transmitting to the base station feedback comprising the determined amount of buffer space used and the number of user devices with data, receiving scheduling information from the base station.

In a further embodiment, a method of operating a relay node configured to communicate with a base station and user devices includes determining a percentage of a maximum amount of data of the user devices, transmitting to the base station feedback comprising the determined percentage of the maximum amount of data for the user devices, and receiving scheduling information from the base station.

In a further embodiment, a relay station is configured to communicate with a base station and user devices. The relay station includes a transceiver for communicating with user devices and a base station. The relay station also includes a processor for determining an amount of downlink buffer space used, determining a number of user devices with downlink data, and determining an amount of uplink buffer space present, and a number of user devices that have uplink data. The relay station further includes a transceiver for communicating with user devices and a base station, where the transceiver transmits to the base station feedback including the amount of downlink buffer space used, the number of user devices with downlink data, the amount of uplink buffer space present, and the number of user devices that have uplink data. The transceiver for communicating with user devices further receives from the base station uplink and downlink scheduling information based on the feedback.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of various embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to various embodiments in a specific context, scheduling transmissions for a wireless networks in a multi-hop environment. Embodiments of the invention may also be applied to transmission in other types of networks.

Figure 1A:
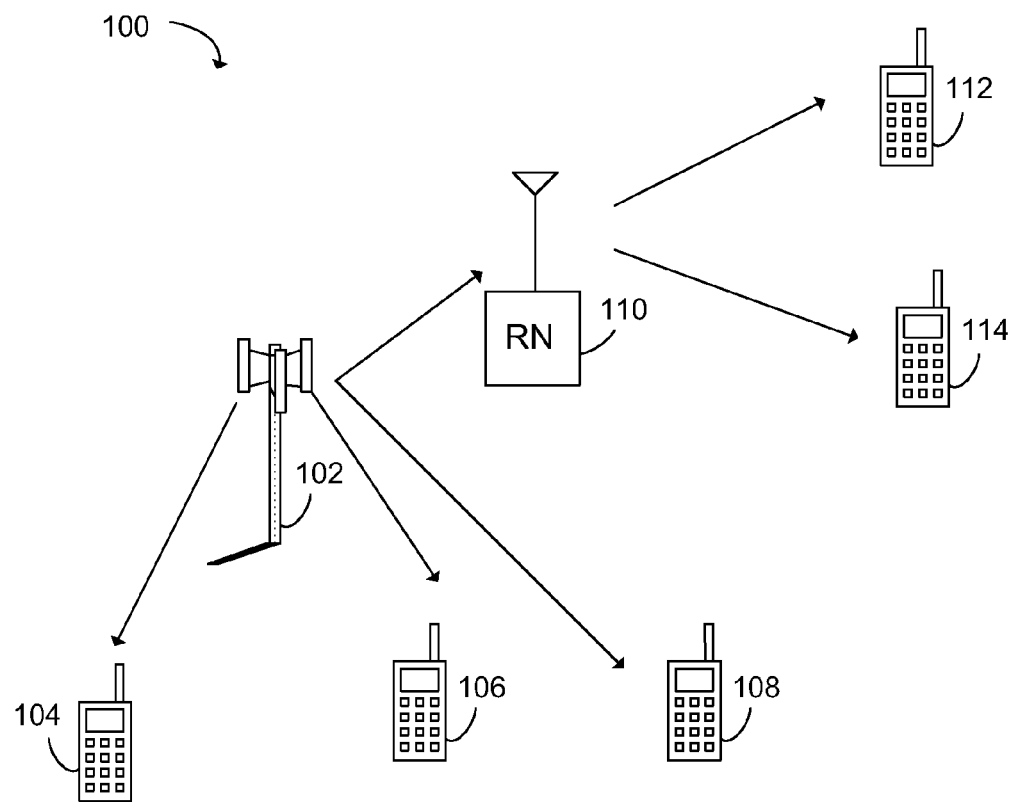
FIGS. 1a-1b illustrate diagrams of an embodiment mobile broadband system.
Figure 1B:
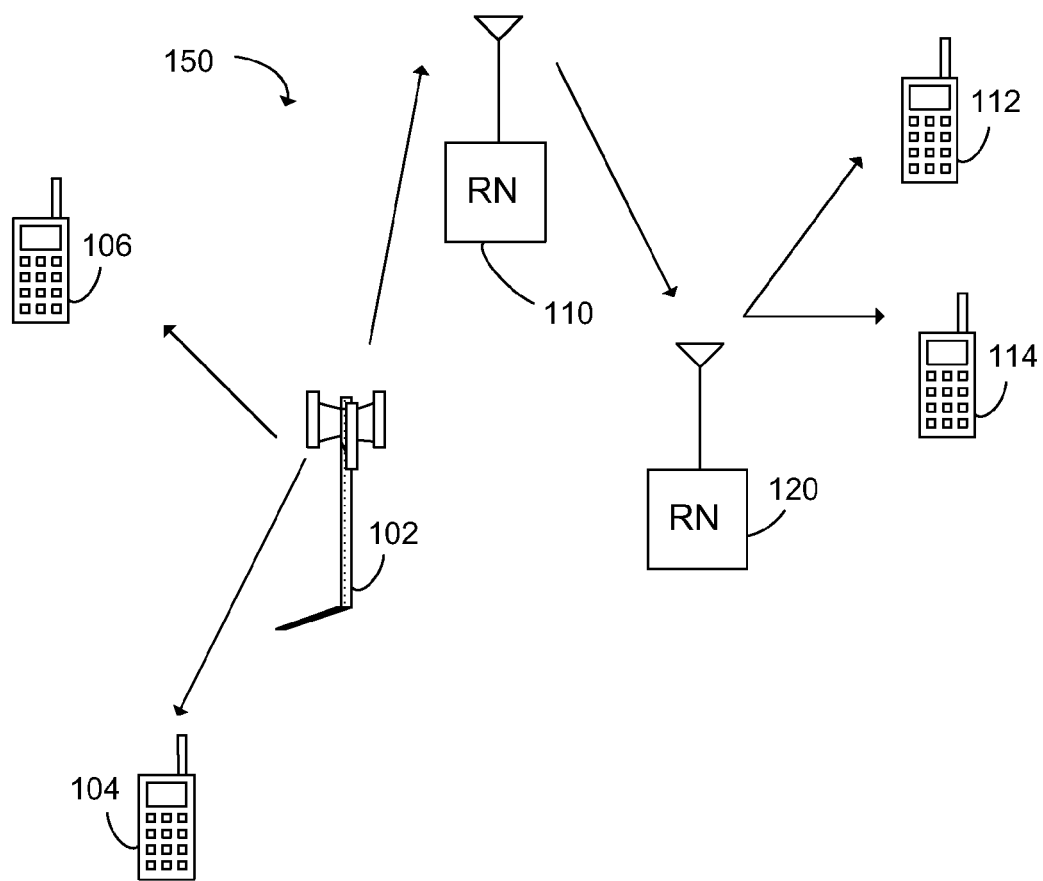

An illustration of an embodiment mobile broadband system 100 is illustrated in FIG. 1a. Mobile broadband system 100 has base station 102 that communicates with mobile terminals or user equipment (UE) 104, 106 and 108. Base station 102 also communicates with RN 110, which is in communication with UEs 112 and 114. While one base station 102, one RN 110 and five UEs 104, 106, 108, 112 and 114 are shown for simplicity of illustration, multiple cells, RNs and UEs can be used and provided for in real systems.

An illustration of an embodiment multi-hop mobile broadband system 150 is illustrated in FIG. 1a. Mobile broadband system 100 has base station 102 that communicates with mobile terminals or user equipment (UE) 104, 106 and 108. Base station 102 also communicates with RN 110, which communicates with second RN 120. RN 120 is in communication with UEs 112 and 114. This system is a multi-hop system because communication between the base station and UEs 112 and 114 are first relayed to RN 110, and then relayed to RN 120 before being transmitted to UEs 112 and 114. While one base station 102, two RNs 110 and 120 and five UEs 104, 106, 108, 112 and 114 are shown for simplicity of illustration, multiple cells, RNs and UEs can be used and provided for in real systems. In embodiments, communication between the base station and the UEs can be relayed by any number of RNs. In further embodiments, a RN can service one or more downstream RNs as well as UEs.

Figure 2:
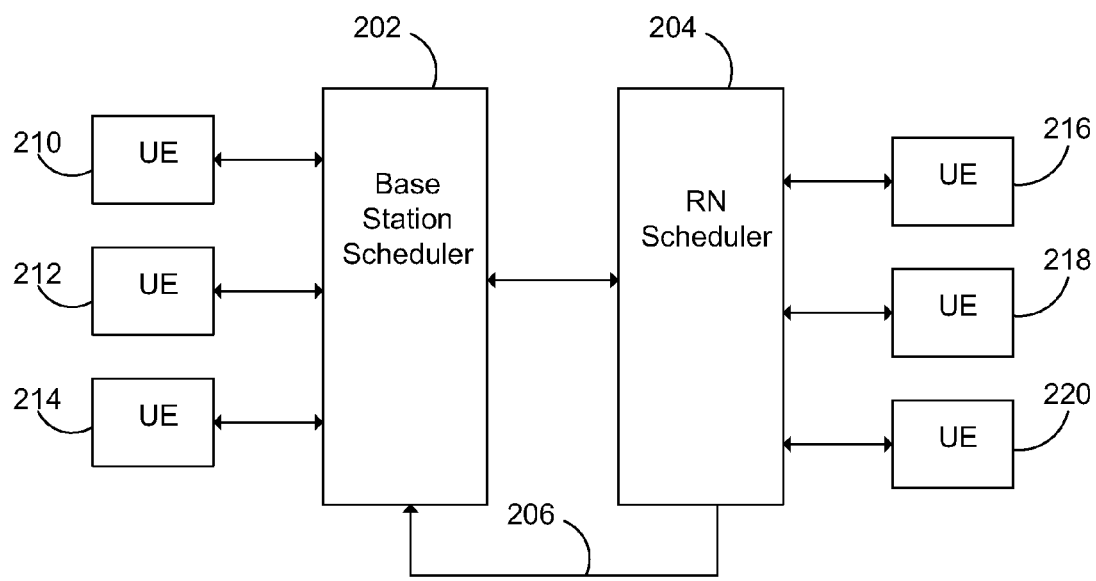
FIG. 2 illustrates a block diagram showing an embodiment relationship between a base station scheduler and a relay node scheduler.

FIG. 2 illustrates a block diagram illustrating the relationship between base station scheduler 202 and the RN scheduler 204. Base station scheduler schedules resources for UEs 210, 212, 214 and RN scheduler 204. RN scheduler 204 schedules resource for UEs 216, 218 and 220. Feedback link 206 provides feedback from the RN scheduler to the base station scheduler.

Figure 3A:
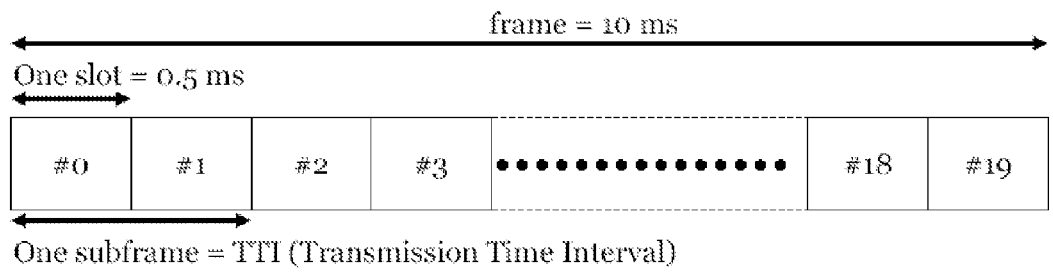
FIGS. 3a-3b illustrate embodiment frame and resource block structures.

FIG. 3a illustrates an embodiment frame according to an embodiment LTE transmission scheme. Each frame lasts 10 ms and contains 20 slots 0 to 19 that last about 0.5 ms each. Two slots make up a transmission time interface (TTI) lasting about 1 ms. In alternative embodiments, other technologies, frame structures and timing can be used.

Figure 3B:
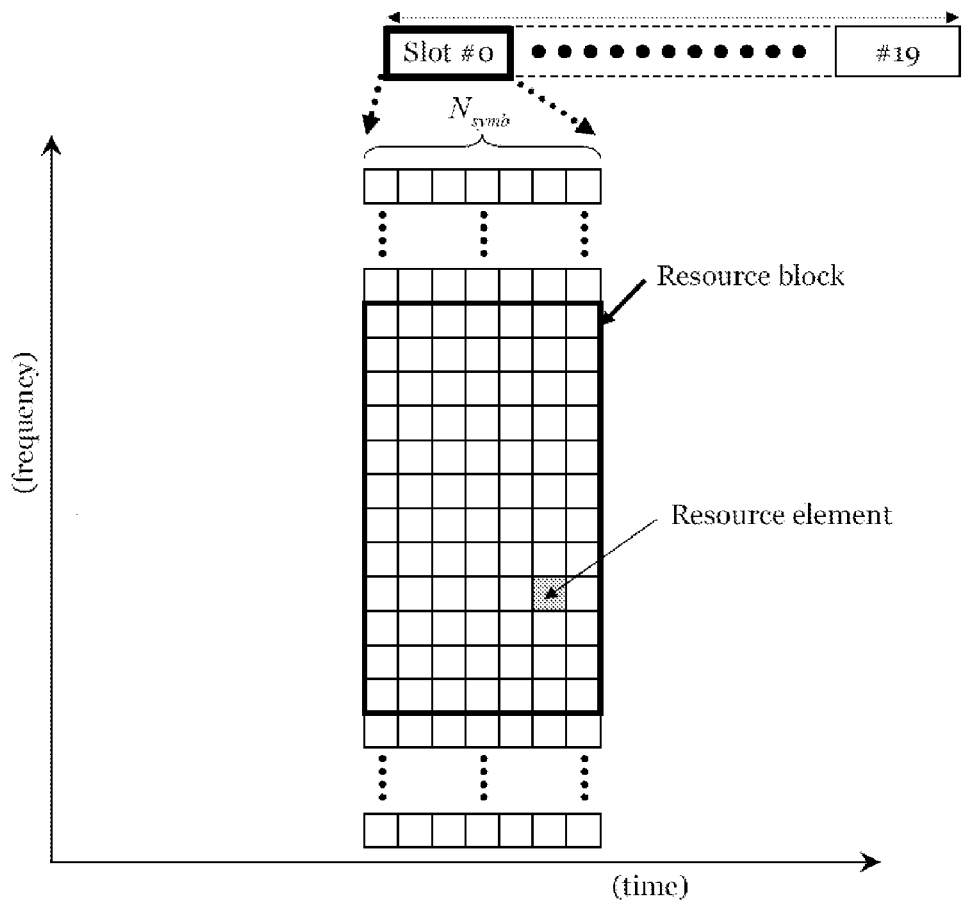

FIG. 3b illustrates a downlink LTE resource block according to an embodiment of the present invention. Each LTE resource block is made of six or seven OFDM symbols in the time domain and 12 subcarriers in the frequency domain. Each subcarrier of an OFDM symbol is referred to as a resource element. Each slot, however, can contain multiple resource blocks. For example, in an embodiment with a 1.4 MHz channel bandwidth, there are 72 occupied subcarriers yielding 6 resource blocks. In an embodiment having a 5 MHz channel bandwidth, there are 300 occupied subcarriers yielding 25 resource blocks. Other combinations are possible according to the LTE specification. In alternative embodiments, the resource block can be an arbitrary number of symbols in the time the time domain using an arbitrary number of subcarriers in the frequency domain. In further embodiments, other modulation schemes can be used besides OFDM, for example, Single Carrier, CDMA, OFDM/OQAM and resource elements can be other types of symbols besides OFDM symbols, such as a single carrier frequency division multiple access (SC-FDMA) symbol.

In an embodiment, the base station also schedules uplink transmissions. The uplink scheduler of the base station assigns the RNs and UEs time and frequency resources as well as modulation and coding rates. Downstream UEs and RNs, on the other hand, determine the content of what is transmitted to upstream base stations and RNs. In an embodiment, LTE system, resources are allocated within SC-FDMA symbols. Alternatively, if other uplink transmission schemes are used, In am embodiment, the base station scheduler schedules downlink resources according to the following utility function for the first hop when an RN is present:

$$U = \frac{r}{r_{ave}} \alpha \sum_{j \in UE} \gamma, \quad (1)$$

where the summation is over all UEs served by the RN. In an embodiment, r is a number of bits that can be transmitted using available resources, and $r_{ave}$ is an average rate of a user. In embodiments, a user can be a user device, or another RN. Furthermore, $\gamma$ is a weighting factor taking into account higher layer priorities, and $\alpha$, which is between 0 and 1, is used for flow control. If the buffer size is too large at the RN, $\alpha$ is reduced so that fewer resources are transmitted and the buffer size is reduced. On the other hand, if the buffer size is too small, $\alpha$ is increased, thereby increasing the amount of resources. In some embodiments, the choice of $\alpha$ is determined using control strategies known in the art. For example, in one embodiment, a PID controller is used to determine $\alpha$. In an embodiment, weighting factor $\gamma$ is adjusted to give priority to higher priority user devices, for example, user devices that are transmitting or receiving guaranteed bit rate (GBR) data.

In other embodiments, other utility functions targeting different fairness/throughput/delay balances may be used. For example, in embodiments, proportionally fair (PF) schedulers and/or non-PF schedulers can be used, and the usage of the feedback $\alpha$ is modified to reflect the used utility functions. Complexity reduction techniques such as choosing user first then resources, or limiting the subset of users for which the utility is calculated can also be applied as known to one skilled in the art.

In an embodiment, $\alpha$ is a constant that depends on buffer sizes at the RN. The determined $\alpha$ depends, for example, on the backhaul of the base station, UE rates, as well as the scheduling algorithm used. In some embodiments, $\alpha$ is updateable as time goes on. In an embodiment, $\alpha$ is determined as follows. First, $\alpha$ is initialed to be $\alpha_0=1$. Next, at every x time periods, $\alpha$ is updated as follows:

$$e_i = \begin{cases} \sum_{j \in UE} \frac{B_{actual,j} - B_{desired,j}}{B_{desired,j}} & \text{per UE feedback} \\ \frac{B_{actual,RN} - B_{desired,RN}}{B_{desired,RN}} & \text{per QoS feedback} \end{cases} \quad (2)$$

$$\alpha_{i+1} = \alpha_i - K_p e_i - K_i \sum_{j=0}^{i} e_j - K_d(e_i - e_{i-1})$$

$$\alpha_{i+1} = \max(0, \alpha_{i+1})$$

$$\alpha_{i+1} = \min(\alpha_{i+1}, 1)$$

where $K_p$, $K_i$, and $K_d$ are chosen to achieve fast convergence, $B_{actual}$ is the instantaneous buffer size at the RN, and $B_{desired}$, is the target buffer size based on traffic type and RN capabilities. In one example, $K_p=0.01$, $K_i=0.5$ and $K_d=0.005$, however, in other embodiment, other values can be used. In other embodiments other parameters other than buffer size are targeted such as delay within the RN buffer, dropped packets etc.

In an embodiment, the value of $\alpha$ could be fed back to the base station from the RN or the calculations could be based on buffer status updates sent periodically from the RN to the base station. In alternative embodiments, $\alpha$ can be determined differently.

In an embodiment, the scheduler calculates the utility function for each user per resource block. The resource block is then assigned to a user device and/or a resource node based on the calculated utility.

In an embodiment, $r_{ave}$ is generated using a filter. In one embodiment the following exponential filter is used:

$$r_{ave,i} = \begin{cases} r_{ave,i-1}(1-W) + Wr_t & \text{Buffer} > 0 \\ r_{ave,i-1} & \text{else,} \end{cases} \quad (3)$$

where $r_t$ is the amount of data transmitted in a TTI. If no data is transmitted, then $r_t=0$. Buffer is the number of bits that are still to be sent in that QoS Class Identifier (QCI), and W is a windowing parameter.

In an embodiment, the RN scheduler feeds back information to the base station scheduler by transmitting $\alpha$ to the base station. Here the RN transmits the required $\alpha$ instead of actual buffer size. In one embodiment, the RN would transmit a quantized message requesting that it receive a certain percentage of the maximum amount of data, which would be the amount of data received if $\alpha=1$. In a further embodiment, the maximum amount of data is the amount of data that would be scheduled for the RN if no flow control was enabled.

In one embodiment, transmitting $\alpha$ includes sending a number between 0 and 1, where $\alpha$ represents an absolute fraction of a maximum data. For example, 0 represents 0%, 0.5 represents 50% of the maximum data, and 1 represents 100% of the maximum data. Alternatively, a relative number can be transmitted. For example, the RN could request 10% more data or 10% less data. In some embodiments, the base station keeps track of the combined messages and caps the range of $\alpha$ between 0 and 1. In a further embodiment, a combination of sending an absolute fraction and a relative number can be used, for example, a message could either be absolute or relative depending on the message sent or configuration used. In one example, message containing $\alpha$ is 3 bits long the first bit indicating if this is a relative or absolute change, and the second 2 bits represent the different values for either the absolute or the relative alpha. For example, if $\alpha$ is absolute the two bits are mapped to [0 0.33 0.66 1]. If $\alpha$ is relative, the two bits map to [0.8 0.9 1 1.1]. In alternative embodiments, other mapping schemes and mapped values can be used.

In an embodiment, the RN transmits multiple $\alpha$ values, where each $\alpha$ value is associated with a category associated with the user device. For example, these categories can be a category for each UE, a category for each quality of service (QoS) classification, or a category per UE and per QoS. Quality of service categories can include, for example, those defined in IPv6 such as conversational voice, real time gaming etc. In further embodiments, grouping can depend on other factors, for example, channel rates, UE speeds, physical location. Groupings can also be defined arbitrarily.

In an embodiment, UEs allocated to different groups, and downlink resources are scheduled according to the following utility function:

$$U = \frac{r}{r_{ave}} \sum_{j \in UE} \sum_{i \in GROUP} \gamma_j, \quad (4)$$

where r is the instantaneous rate of the backhaul, and $r_{ave}$ is the average rate of the backhaul, and GROUP represents groups of UEs. UEs which are not RN would only reflect themselves and the summation would only be of a single point. In a further embodiment, rather than having the summation in the utility function, a modified filter function is applied to $r_{ave}$. In one embodiment, $r_{ave}$ is determined as follows:

$$r_{ave,i} = \begin{cases} r_{ave,i-1}(1-W) + W \frac{r_t}{\sum_{j \in UE} \sum_{i \in GROUP} \gamma_j} & \text{any Buffer} > 0 \\ r_{ave,i-1} & \text{else,} \end{cases} \quad (5)$$

where the scheduling utility function is:

$$U = \frac{r}{r_{ave}}. \quad (6)$$

In embodiments having delay sensitive traffic, for example, when groups represent different QoS groups, the following utility function is used for scheduling:

$$U = \frac{r}{r_{ave}} \alpha \sum_{j \in UE} \gamma f_{QoS}(d), \quad (7)$$

where $f_{QoS}(d)$ is a monotonic increasing function, d is a delay time since a packet has arrived in the queue at the BS dependent on delay threshold dth of the various QoS categories. The length time a packet is valid is represented by dth. In one embodiment, $$f_{QoS}(d) = 1 + e^{d - \frac{dth}{2}}. \quad (8)$$

For non-delay sensitive traffic, $f_{QoS}(d)=1$. In further embodiments, other functions for $f_{QoS}(d)$ can be used. In further embodiments, $f_{QoS}(\ )$ can be a function of all the packets in the queue, or previous elements of the queue and not just the oldest one, for instance, scheduling methods involving average transmission delay in the queue.

In embodiments, α transmitted to the base station from the RN is used by the base station scheduler to schedule downlink resources. Alternatively, this data can be used to schedule uplink resources.

In an embodiment, uplink resources are scheduled also using the utility function:

$$U = \frac{r}{r_{ave}} \sum_{j \in UE} \gamma. \quad (9)$$

In an embodiment, the summation is made over the number of UEs that have data in the RN buffer. In an embodiment, the RN feeds back a total buffer size for the RN and the number of user devices serviced by the RN or devices services by the RN that have data present at the RN to transmit to the BS.

In a further embodiment, the RN feeds back a total buffer size and the number of user devices serviced by the RN or devices serviced by the RN that have data for each of a number of different classifications. In some embodiments, the total buffer size could be broken down into these groups as well. For example, these categories can be a category for each UE, a category for each quality of service (QoS) classification, or a category per UE and per QoS. Quality of service categories can include, for example, those defined in IPv6 such as conversational voice, real time gaming etc. In further embodiments, grouping can depend on other factors, for example, channel rates, UE speeds, physical location. Groupings can also be defined arbitrarily.

In a further embodiment, the RN feeds back a total buffer size and the number of user devices or devices serviced by the RN that have active data in the RN buffer where the user devices/services have been pre-divided into different categories using long term signaling. These users can be divided into groups based on their approximate channel qualities or other factors depending on implementation. In some embodiments, the utility function of equation (4) and the exponential filter of equation (5) is used.

In a further embodiment, the RN feeds back the total buffer size for a pre-divided set as mentioned above, as well as an explicit indication of which UEs have active data in the RN buffer. This explicit indication can be in the form of a bitmap, UE id or some other compression method.

In an embodiment, delay sensitive resources are scheduled by the base station according to the following utility function:

$$U = \frac{r}{r_{ave}} f(d/d_{th}) \gamma, \quad (10)$$

wherein U is the utility function, r is a number of bits that can be transmitted using available resources, $r_{ave}$ is an average rate of a user in a particular channel quality index category, γ is a weighting factor based on the particular channel quality index category, d is a delay time since a packet has arrived in the queue at the BS, $d_{th}$ is a delay threshold representing a length of time a packet is valid, and $f$ is a monotonic function. In some embodiments, $f$ is an exponential function such as equation (8).

Figure 4:
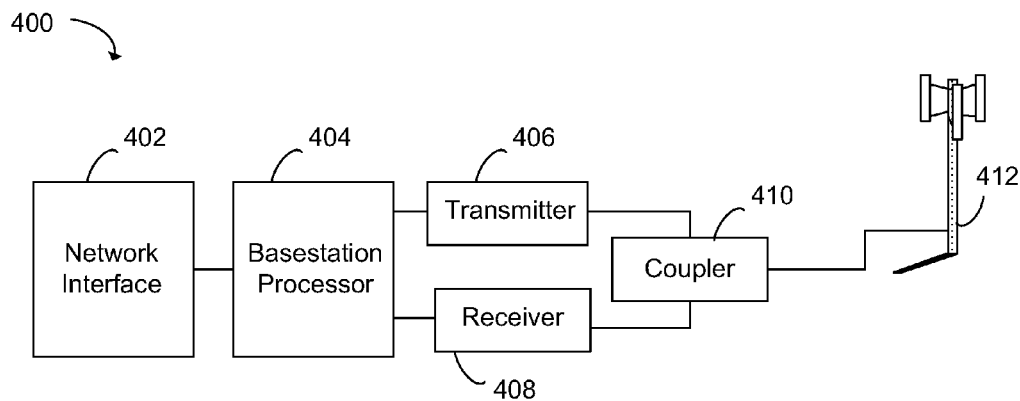
FIG. 4 illustrates a block diagram of an embodiment base station.

A block diagram of an embodiment base station 400 is illustrated in FIG. 4. Base station 400 has base station processor 404 coupled to transmitter 406 and receiver 408, and network interface 402. Transmitter 406 and receiver 408 are coupled to antenna 412 via coupler 410. Base station processor 404 executes embodiment methods and algorithms. In an embodiment, base station 400 is configured to operate in a LTE network using an OFDMA downlink channel divided into multiple subbands and using single carrier FDMA in the uplink. In alternative embodiments, other systems, network types and transmission schemes can be used, for example, 1XEV-DO, IEEE 802.11, IEEE 802.15 and IEEE 802.16. In alternative embodiments, base station 400 can have multiple transmitters, receivers and antennas (not shown) to support MIMO operation.

Figure 5:
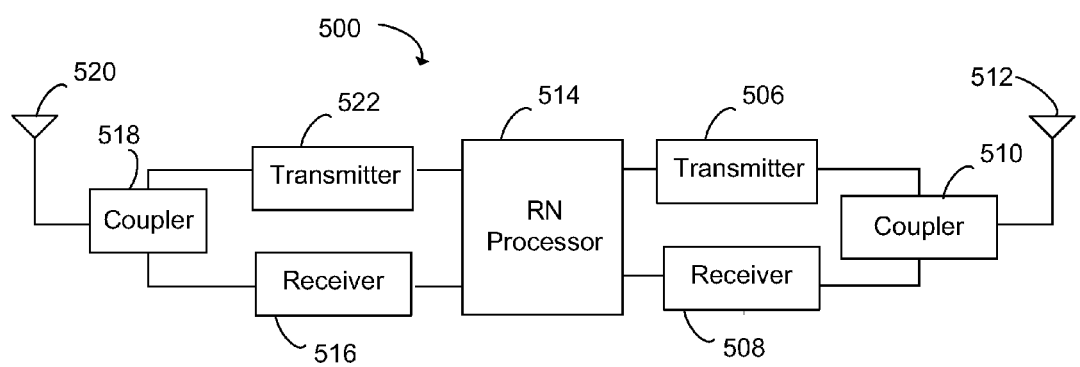
FIG. 5 illustrates a block diagram of an embodiment relay node.

A block diagram of an embodiment relay node 500 is shown in FIG. 5. Relay node 500 has donor antenna 520, which transmits to and from the base station and is coupled to coupler 518, transmitter 522 and receiver 516. Service antenna 512, which transmits to and receives signals from user devices is coupled to coupler 510, transmitter 506 and receiver 508. RN processor 514, which is coupled to both the donor and service signal paths, controls the operation of relay node and implements embodiment algorithms described herein. In an embodiment of the present invention, relay node 500 is configured to operate in a LTE network using an OFDMA downlink channel divided into multiple subbands and using single carrier FDMA in the uplink. In alternative embodiments, other systems, network types and transmission schemes can be used.

Figure 6:
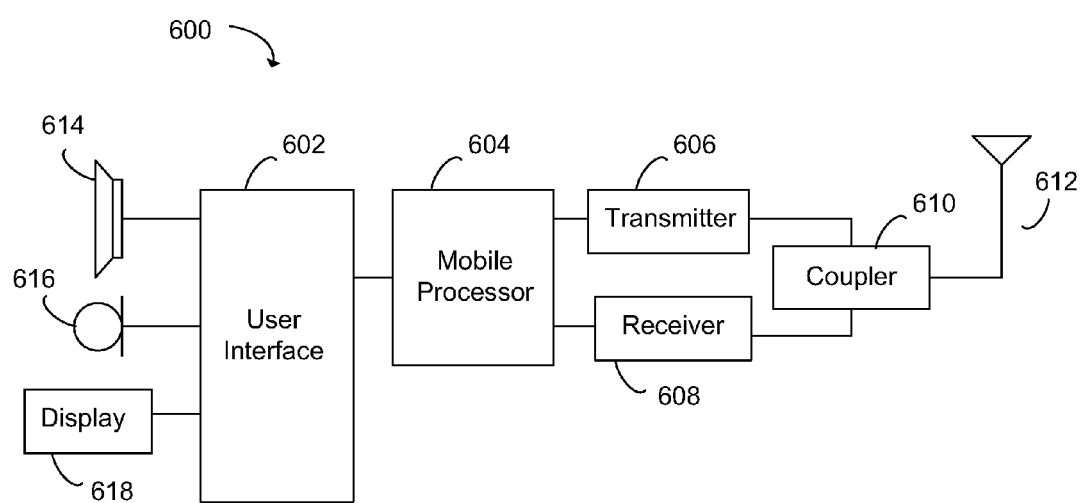
FIG. 6 illustrates a block diagram of an embodiment user device.

A block diagram of embodiment user device 600 is illustrated in FIG. 6. User device 600 can be, for example, a cellular telephone or other mobile communication device, such as a computer or network enabled peripheral. Alternatively, user device 600 can be a non-mobile device, such as a desktop computer with wireless network connectivity. User device 600 has mobile processor 604, transmitter 606 and receiver 608, which are coupled to antenna 612 via coupler 610. User interface 602 is coupled to mobile processor 604 and provides interfaces to loudspeaker 614, microphone 616 and display 618, for example. Alternatively, user device 600 may have a different configuration with respect to user interface 602, or user interface 602 may be omitted entirely. In embodiment, user device is configured to operate according to embodiment algorithms. In alternative embodiments, user device 600 can have multiple transmitters, receivers and antennas (not shown) to support MIMO operation.

In accordance with an embodiment, a method of operating a base station configured to communicate with a relaying station includes allocating resources to the relay station. Allocating resources includes receiving feedback data from the relay station and scheduling resources to the relay station based on feedback data. Feedback data includes a total buffer size of the relay station and a number of user devices. In an embodiment, the base station is an eNodeB operating on a LTE network, and the relay station is an RN. In an embodiment, the number of user devices includes a number of user devices for which the relay station has data in its buffer. In a further embodiment, the feedback data further comprises an identity of the user devices for which the relay station has data. In an embodiment, scheduling resources includes scheduling resources using a proportionally fair (PF) scheduler. In a further embodiment, a non-PF scheduler is used.

In a further embodiment, the user devices includes categories of user devices, and the feedback data further includes a number of user devices within one of at least one of the categories, and a buffer size for at least one of the categories. In some embodiments the categories comprise quality of service (QoS) categories. In an embodiment the users for which the relay has data are indicated using a bitmap.

In one embodiment, scheduling resources includes using a utility function:

$$U = \frac{r}{r_{ave}} \sum_{j \in UE} \gamma,$$

where U is the utility function, r is a number of bits that can be transmitted using available resources, $r_{ave}$ is an average rate of a user, and γ is a weighting factor taking into account higher layer priorities. In some embodiments, allocating resources includes allocating uplink resources.

In accordance with another embodiment, a method of operating a base station configured to communicate with a relay station includes allocating resources to the relay station. Allocating includes receiving feedback data from the repeating station, the feedback data comprising a percentage of a maximum amount of data, and scheduling resources to the relay station based on the feedback data. In an embodiment, the percentage includes a relative percentage of calculated maximum amount of data. In a further embodiment, user devices includes categories of user devices, and the feedback data further includes a percentage of a maximum amount of data for at least one of the categories. In an embodiment, allocating resources includes allocating downlink resources.

In a further embodiment, a method of operating a relay node configured to communicate with a base station and user devices includes determining an amount of buffer space used, determining a number of user devices with data, transmitting to the base station feedback comprising the determined amount of buffer space used and the number of user devices with data, receiving scheduling information from the base station. In an embodiment, the method further includes categorizing the user devices into categories, and determining a number of user devices in each category. In some embodiments, the feedback data further includes the number of user devices in each category.

In an embodiment, the method also includes determining an amount of buffer space used for each of the categories, and the feedback data further includes the amount of buffer space used for each of the categories. In some embodiments, the buffer space used includes buffer space for downlink transmission to the user devices.

In a further embodiment, a method of operating a relay node configured to communicate with a base station and user devices includes determining a percentage of a maximum amount of data of the user devices, transmitting to the base station feedback comprising the determined percentage of the maximum amount of data for the user devices, and receiving scheduling information from the base station. In an embodiment, the percentage comprises a relative percentage of a previous amount of data.

In an embodiment, the method further includes categorizing the user devices into categories and determining a percentage of a maximum amount of data of the user devices in each category. In some embodiments, the feedback further includes the maximum amount of data of user devices in each category. In a further embodiment, determining the percentage of the maximum amount of data includes determining the percentage of the maximum amount of data for a downlink path.

In another embodiment, a base station includes a transceiver for communicating with user devices and a relay station, and a processor for allocating resources to the repeating station. The processor receives a first and second set of feedback data from the relay station. The first set of feedback data includes a total uplink buffer size of the relay station and a number of user devices, and the second set of feedback data includes a percentage of a maximum amount of downlink data. The processor further schedules uplink resources to the relay station based on the first set of feedback data, and schedules downlink resources to the repeating station based on the second set of feedback data. In an embodiment, the base station is an eNodeB operating on a LTE network, and the relay station is an RN.

In a further embodiment, a relay station is configured to communicate with a base station and user devices. The relay station includes a transceiver for communicating with user devices and a base station. The relay station also includes a processor for determining an amount of downlink buffer space used, determining a number of user devices with downlink data, and determining an amount of uplink buffer space present, and a number of user devices that have uplink data. The relay station further includes a transceiver for communicating with user devices and a base station, where the transceiver transmits to the base station feedback including the amount of downlink buffer space used, the number of user devices with downlink data, the amount of uplink buffer space present, and the number of user devices that have uplink data. The transceiver for communicating with user devices further receives from the base station uplink and downlink scheduling information based on the feedback. In an embodiment, the relay station is an RN operating on a LTE network, and the base station is an eNodeB.

An advantage of embodiments is that high scheduling performance can be achieved without a high overhead for buffer status feedback. For example, in some embodiments, explicit feedback of the different RN buffer sizes is not necessary to be fed back, thereby saving bandwidth and allowing more bandwidth to be devoted to service content.

Although present embodiments and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of operating a base station configured to communicate with a relay station, the method comprising:

allocating resources to the relay station, the allocating comprising
receiving feedback data from the relay station, the feedback data comprising a total buffer size of the relay station and a number of user devices, and
scheduling resources to the relay station in accordance with the feedback data, wherein scheduling the resources comprises using a utility function:

$$U = \frac{r}{r_{ave}} \alpha \sum_{j \in UE} \gamma_j,$$

wherein U is the utility function, r is a number of bits that can be transmitted using available resources, $r_{ave}$ is an average rate of a user, J∈UE indicates all user devices served by the relay station, α is a value between 0 and 1 determined in accordance with the feedback data, and $\gamma_j$ is a weighting factor for a $j^{th}$ user device served by the relay station taking into account higher layer priorities.

2. The method of claim 1, wherein scheduling resources comprises scheduling resources using a proportionally fair (PF) scheduler.

3. The method of claim 1, wherein:
the base station operates on a long term evolution (LTE) network;
the base station comprises an eNodeB; and
the relay station comprises a relay node (RN).

4. The method of claim 1, wherein the number of user devices comprises a number of user devices for which the relay station has data in its buffer.

5. The method of claim 4, wherein the feedback data further comprises an identity of the user devices for which the relay station has data.

6. The method of claim 4, wherein: the users for which the relay has data are indicated using a bitmap.

7. The method of claim 1, wherein:
the user devices comprise categories of user devices; and
the feedback data further comprises a number of user devices within at least one of the categories and a buffer size for at least one of the categories.

8. The method of claim 7, wherein the categories comprise quality of service (QoS) categories.

9. The method of claim 1, wherein allocating resources comprises allocating uplink resources.

10. A method of operating a base station configured to communicate with a relay station, the method comprising:
allocating resources to the relay station, the allocating comprising
receiving feedback data from the relay station, the feedback data comprising a percentage of a maximum amount of data; and
scheduling resources to the relay station in accordance with the feedback data wherein scheduling the resources comprises scheduling the resources using a utility function in accordance with the feedback data, and in accordance with a ratio of a number of bits that can be transmitted using available resources to an average rate of a user.

11. The method of claim 10, wherein the percentage comprises a relative percentage of a calculated maximum amount of data.

12. The method of claim 10, wherein:
user devices comprise categories of user devices; and
the feedback data further comprises a percentage of a maximum amount of data for at least one of the categories.

13. The method of claim 10, wherein allocating resources comprises allocating downlink resources.

14. A method of operating a relay node configured to communicate with a base station and user devices, the method comprising:
determining an amount of buffer space used;
determining a number of user devices with data;
transmitting feedback data to the base station, the feedback comprising the determined amount of buffer space used and the number user devices with data; and
receiving scheduling information from the base station, wherein the scheduling information comprises allocated resources scheduled with a utility function in accordance with the feedback data, and in accordance with a ratio of a number of bits that can be transmitted using available resources to an average rate of a user.

15. The method of claim 14, further comprising;
categorizing the user devices into categories; and
determining a number of user devices in each category, wherein the feedback data further comprises the number of user devices in each category.

16. The method of claim 15, further comprising:
determining an amount of buffer space used for each of the categories, and wherein the feedback data further comprises the amount of buffer space used for each of the categories.

17. The method of claim 14, wherein the buffer space used comprises buffer space for downlink transmission to the user devices.

18. A method of operating a relay node configured to communicate with a base station and user devices, the method comprising:
determining a percentage of a maximum amount of data of the user devices;
transmitting feedback to the base station, the feedback comprising the determined percentage of the maximum amount of data for the user devices; and
receiving scheduling information from the base station, wherein the scheduling information comprises allocated resources scheduled with a utility function in accordance with the feedback data, and in accordance with a ratio of a number of bits that can be transmitted using available resources to an average rate of a user.

19. The method of claim 18, wherein the percentage comprises a relative percentage of a previous amount of data.

20. The method of claim 18, further comprising
categorizing the user devices into categories; and
determining a percentage of a maximum amount of data of the user devices in each category, wherein the feedback further comprises the maximum amount of data of user devices in each category.

21. The method of claim 18, wherein determining the percentage of the maximum amount of data comprises determining the percentage of the maximum amount of data for a downlink path.

22. A relay station configured to communicate with a base station and user devices, the relay station comprising:
a processor configured to:
determine an amount of downlink buffer space used,
determine a number of user devices with downlink data, and
determine an amount of uplink buffer space present, and a number of user devices that have uplink data; and
a transceiver configured to communicate with user devices and the base station, wherein the transceiver is further configured to transmit feedback to the base station, the feedback comprising the amount of downlink buffer space used, the number of user devices with downlink data, the amount of uplink buffer space present, and the number of user devices that have uplink data, and receive uplink and downlink scheduling information from the base station in accordance with the feedback, wherein the scheduling information comprises allocated resources scheduled with a utility function in accordance with the feedback data, and in accordance with a ratio of a number of bits that can be transmitted using available resources to an average rate of a user.

23. The relay station of claim 22, wherein:

the relay station is configured to operate on a long term evolution (LTE) network;

the base station comprises an eNodeB; and the relay station comprises a relay node (RN).

\* \* \* \* \*